United States Patent [19]

McNamara et al.

[11] Patent Number: 5,735,319
[45] Date of Patent: Apr. 7, 1998

[54] DISPERSING APPARATUS AND METHOD

[76] Inventors: John O. McNamara, 398 Amanda Dr., Savannah, Ga. 31406; John Patrick McNamara, 1963 Banyon Tree Rd., Collinsville, Ill. 62234

[21] Appl. No.: 538,700

[22] Filed: Oct. 3, 1995

[51] Int. Cl.$^6$ ........................................................ B65B 1/04
[52] U.S. Cl. ..................... 141/286; 141/98; 414/299; 239/687; 239/498
[58] Field of Search ............................. 141/286, 4, 98, 141/1; 239/672, 498, 500, 501, 518, 665–666, 668, 669, 679, 681, 687, 670, 650; 414/141.8, 143.1, 158, 174, 195, 299–302, 588

[56] References Cited

U.S. PATENT DOCUMENTS

| | | | |
|---|---|---|---|
| 2,538,413 | 1/1951 | Chard | 239/650 |
| 2,980,009 | 4/1961 | Donelson, Jr. | 98/55 |
| 3,045,840 | 7/1962 | Donelson, Jr. | 214/17 |
| 3,064,833 | 11/1962 | Von Ruden | 214/17 |
| 3,248,117 | 4/1966 | Donelson, Jr. | 275/15 |
| 3,371,870 | 3/1968 | Harrer | 239/684 |
| 3,490,619 | 1/1970 | De Wittie | 214/17 |
| 3,563,476 | 2/1971 | Donelson, Jr. | 239/668 |
| 3,682,394 | 8/1972 | Shivvers | 239/665 |
| 3,880,300 | 4/1975 | Uhl | 214/17 CB |
| 4,031,929 | 6/1977 | Cobb et al. | 239/684 |
| 4,397,423 | 8/1983 | Beaver et al. | 239/684 |
| 4,424,837 | 1/1984 | Farrell | 141/284 |
| 4,776,519 | 10/1988 | Zweegers | 239/670 |
| 5,348,434 | 9/1994 | Peeples et al. | 414/301 |
| 5,421,379 | 6/1995 | Geiser | 239/687 |

*Primary Examiner*—Henry J. Recla
*Assistant Examiner*—Steven O. Douglas

[57] ABSTRACT

A dispersing apparatus (10, 110, 210) uniformly disperses a stream of material pieces, such as wood chips, into a storage area (84) from an overhead feeding channel in order to achieve efficient and compact accumulation of the material pieces in the storage area (84). The dispersing apparatus (10, 110, 210) is detachably mounted to the feeding channel and has an impeller (18, 118) with a plurality of impeller blades (22a–22d; 122a–122d) for rotating through the stream of wood chips for transversely engaging the same. As a result, the wood chips are propelled outwardly from the feeding channel and uniformly toward the storage area (84). A first impeller (18) is shaped in the form of a cone configuration and is utilized to project material pieces outwardly and downwardly from the feeding channel. A second impeller (118) has a dish (128) with a concave deflection surface (132) for directing the material pieces outwardly and upwardly from the feeding channel. A directional deflection mechanism (212) having a deflector shield (214) may be implemented on the dispersing apparatus (10, 110, 210) in order to selectively direct the distribution of wood chips into the storage area (84).

9 Claims, 8 Drawing Sheets

DISPERSING APPARATUS AND METHOD

FIELD OF THE INVENTION

The present invention generally relates to loading systems for ships, barges, trucks, railroad cars, and other transportation vessels, and more particularly, to a dispersing apparatus and method for uniformly dispersing a stream of material pieces into a storage area from an overhead supply outlet in order to achieve efficient and compact accumulation of the material pieces in the storage area.

BACKGROUND OF THE INVENTION

Many conventional techniques are known in the industry for loading ships, barges, trucks, railroad cars, or other transportation vessels with material pieces, such as wood chips. Needless to say, when transportation vessels are loaded with wood chips, compact placement and storage of the wood chips optimizes efficiency and minimizes shipping costs.

A conventional technique for loading transportation vessels is to simply drop the wood chips by force of gravity into a storage area and then subsequently move the wood chips around using bulldozers or the like in an attempt to utilize all available space and to compact the wood chips to a certain extent. Another conventional technique utilizes an air conveyor for blowing the wood chips around in the storage space of the vessel. Moreover, another conventional technique involves the use of high speed spinners for propelling the wood chips into all areas of the storage space of the vessel. Still another conventional technique involves the use of vibrators for jarring the wood chips after loading in an attempt to effectuate compact storage.

However, none of the foregoing conventional techniques adequately compacts the wood chips during or after placement. When using the prior art techniques, the wood chips are not efficiently stacked in the storage areas and, consequently, numerous undesirable air pockets exist within the wood chip accumulations. The problem is further compounded by the fact that although the wood chips are generally a flat rectangular or rhomboid shape, they are not all the same size and shape. Moreover, the storage areas may take a variety of shapes and sizes thereby making it difficult to efficiently place wood chips in a particular region, such as in a corner of a rectangular storage area or under a receding top deck of a storage area. Another example is around the hold web frames and tween-deck webs of a ship hold.

Hence, a heretofore unaddressed need exists in the industry for an apparatus and method for efficiently and compactly placing and storing material pieces, such as but not limited to, wood chips, which may have irregular sizes and shapes, in a variety of storage areas of transportation vessels in order to achieve optimum shipping efficiency and thereby minimize shipping costs.

SUMMARY OF THE INVENTION

Thus, an object of the present invention is to overcome the deficiencies and inadequacies of the prior art as described above.

Another object of the present invention is to provide an apparatus and method for efficiently and compactly placing and storing material pieces, for example, wood chips, which may exhibit irregular sizes and shapes, in a variety of storage areas located in, for example, a ship, barge, truck, railroad car, and other transportation vessel.

Another object of the present invention is to provide an apparatus and method for minimizing the shipping costs of numerous material pieces, which may have irregular sizes and shapes.

Another object of the present invention is to provide an apparatus and method for efficiently and compactly placing and storing material pieces into the top regions of storage areas.

Another object of the present invention is to provide an apparatus and method for efficiently and compactly placing and storing material pieces into the corners of storage areas.

Another object of the present invention is to provide an apparatus and method for uniformly dispersing material pieces into a storage area.

Another object of the present invention is to provide an apparatus and method for uniformly dispersing material pieces into the top regions of storage areas.

Another object of the present invention is to provide an apparatus and method for selectively dispersing material pieces into desired regions, for example, into corners of storage areas.

Another object of the present invention is to provide a dispersing apparatus which is simple in design, durable in structure, inexpensive to manufacture, and efficient as well as reliable in operation.

The present invention is a dispersing apparatus and method for uniformly dispersing a stream of material pieces into a storage area from a supply outlet of a feeding channel in order to achieve efficient and compact accumulation of the material pieces in the storage area. The dispersing apparatus is configured to be disposed substantially adjacent to the supply outlet. Further, the dispersing apparatus has an impeller with a plurality of impeller blades for rotating through the stream of material pieces for transversely engaging the material pieces. As a consequence, the material pieces are propelled outwardly from the supply outlet and uniformly toward the storage area.

A significant feature of the present invention is the implementation of interchangeable impellers which are configured to produce different dispersal patterns. In a first embodiment of the impeller, referred to herein as the cone-like impeller, the impeller blades are arranged in a cone configuration so that the material pieces flow through the cone configuration and are deflected radially outwardly and downwardly from the supply outlet of the feeding channel. The impeller blades join at an apex at a bottom end of the cone configuration. A ring of bearings are situated at a top end of the cone configuration for permitting rotation of the impeller blades about an axis substantially in line with the stream of material pieces falling downward from the supply outlet. The cone configuration is driven by a belt engaging the periphery of the ring of bearings and a driving shaft of a motor mechanism.

In a second embodiment of the impeller, referred to herein as the dish-like impeller, a dish-like deflection surface is situated beneath the impeller blades. The dish-like deflection surface is disposed substantially orthogonal to the stream of material pieces and deflects the material pieces radially upwardly from the supply outlet of the feeding channel.

Another significant feature of the present invention is that the dispersing apparatus may also be equipped with a deflector shield situated about the axis of rotation of the impeller. The deflector shield directs the material pieces in a particular selectable direction. Consequently, the deflector shield can be used to confine the respective radial dispersal pattern provided by the cone-like and the dish-like impellers.

Another significant feature of the present invention is a mechanism for angularly adjusting the cone configuration.

Angular adjustment of the cone configuration can be used to adjust the center of material piece distribution. Furthermore, angular adjustment can be used to ensure that material pieces dropping into the impeller blades are centrally focused; thereby ensuring uniform distribution of the material pieces toward the storage area. The foregoing feature is particularly advantageous when material pieces exhibit spiralling motion down through the feeding channel to the supply outlet.

Another significant feature of the present invention is a mechanism for constricting the stream of material pieces before the impeller blades engage the material pieces. This feature provides for a more efficient process and more efficient distribution of the material pieces.

Other objects, features and advantages of the present invention will become apparent to one of skill in the art upon examination of the following drawings and the associated detailed description.

DETAILED DESCRIPTION OF THE PREFERRED EMBODIMENT

Figure 1:
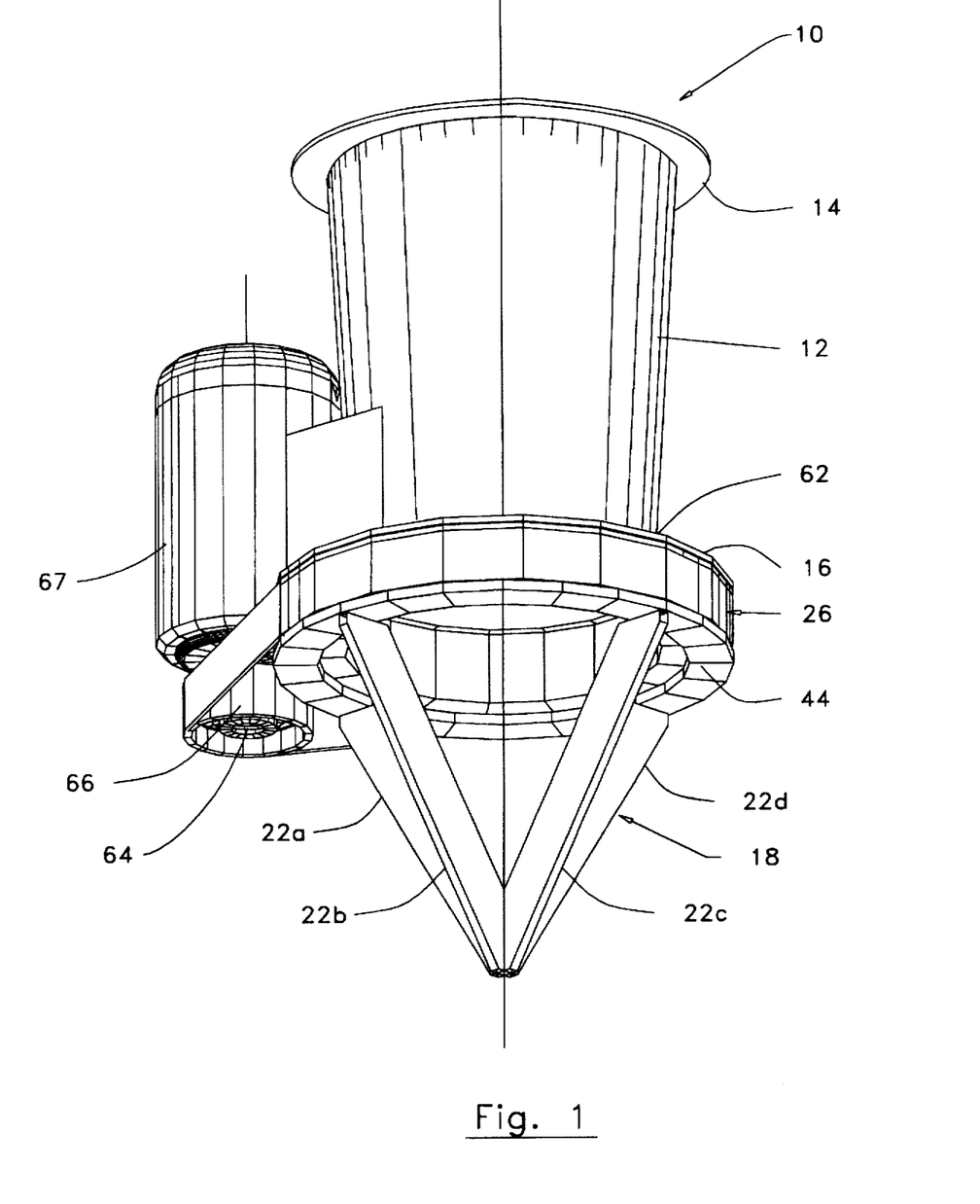
FIG. 1 is a perspective view of a first embodiment of a dispersing apparatus in accordance with the present invention having a cone-like impeller.
Figure 3:
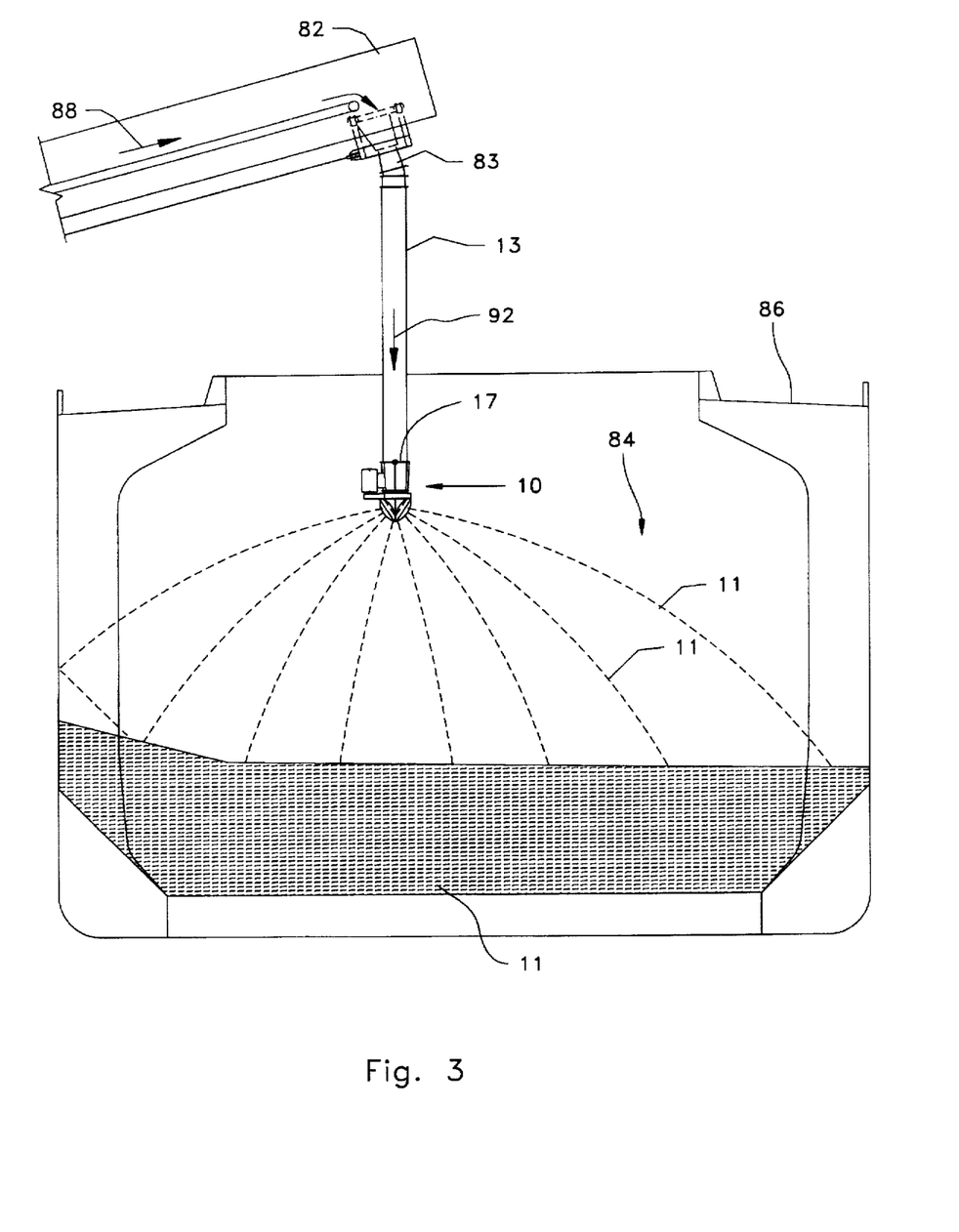
FIG. 3 is a side view of the dispersing apparatus of FIGS. 1 and 2 showing uniform dispersal of material pieces toward a storage area in a transportation vessel.
Figure 4:
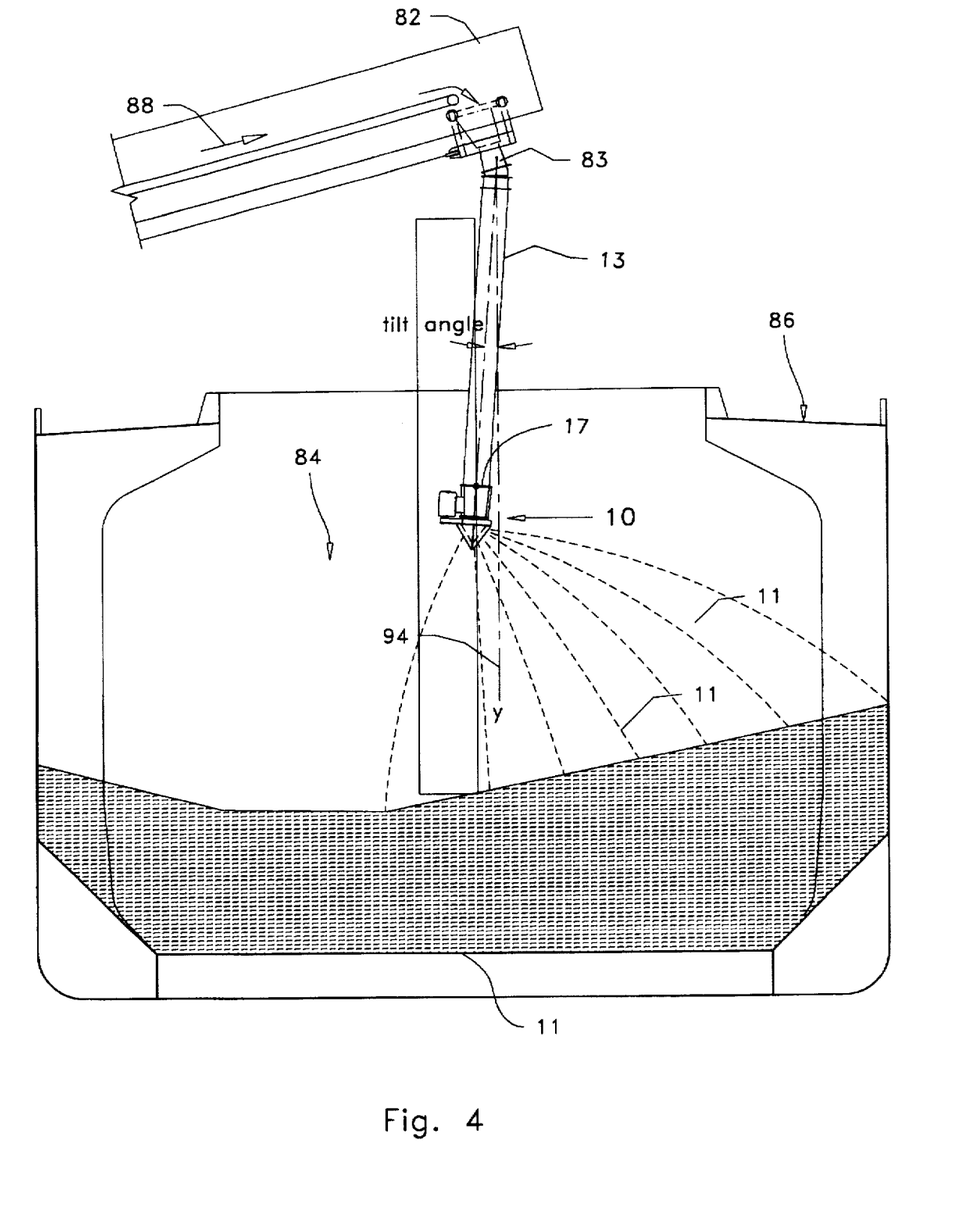
FIG. 4 shows a side view of the dispersing apparatus 10 of FIGS. 1 and 2 which has been angled slightly from its free-standing vertical axis in order to thereby move the center of material piece distribution.
Figure 9:
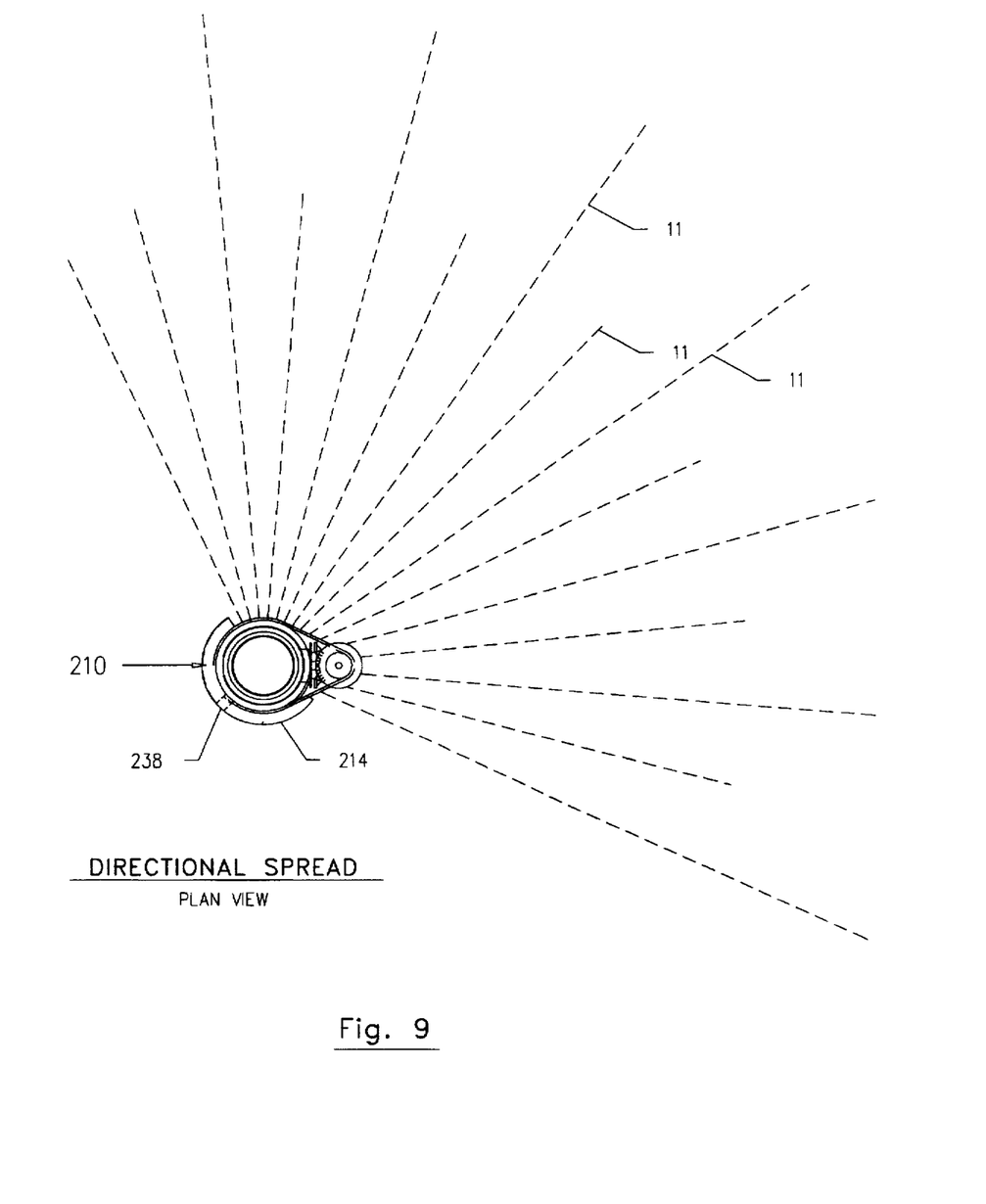

Referring now to the figures wherein like numerals designate corresponding parts throughout the several views, FIG. 1 illustrates a first embodiment of a novel dispersing apparatus in accordance with the present invention, which is generally denoted by reference numeral 10. The dispersing apparatus 10 provides for uniform dispersal of material pieces 11 (FIGS. 3, 4, 9), for instance, wood chips, supplied by a feeding channel 13 (FIGS. 3, 4, 9) at the points of impact and final placement, thereby resulting in efficient and compact accumulation of the material pieces 11 in a storage area 84 (FIGS. 3, 4, 9).

The dispersing apparatus 10 has a cylindrical tube spout 12 with an upper flange 14 and a lower flange 16. The tube spout 12 is configured to connect by its upper flange 14 in mating engagement with an overhead supply outlet 17 (FIGS. 3, 4, 9) of the feeding channel 13 for dispensing material pieces 11. Preferably, the tube spout 12 receives material pieces 11 dropped under the force of gravity through the feeding channel 13 and out of the supply outlet 17. The lower flange 16 enables mounting of the tube spout 12 to any of a plurality of possible interchangeable impellers and associated apparatus, which are described in further detail hereinafter.

A first embodiment of the impeller, which is generally denoted by reference numeral 18 in FIG. 1, has a plurality of rotatable impeller blades 22a–22d for rotating through the stream of material pieces 11 passing downwardly through the tube spout 12. The impeller blades 22a–22d transversely engage the material pieces 11 in order to propel the material pieces 11 outwardly and downwardly from the dispersing apparatus 10 and uniformly toward the storage area 84. In the cone-like impeller 18, the impeller blades 22a–22d are essentially arranged to form a cone configuration with the impeller blades 22a–22d symmetrically spaced 90 degrees apart and joined at a bottom end 24. From the bottom end 24, the impeller blades 22a–22d rise upwardly and outwardly to a circular bearing housing 26 where they are affixed thereto. It should be emphasized that although the impeller 18 in FIG. 1 shows four impeller blades 22a–22d, any number and orientation of impeller blades 22a–22d may be utilized.

Figure 2:
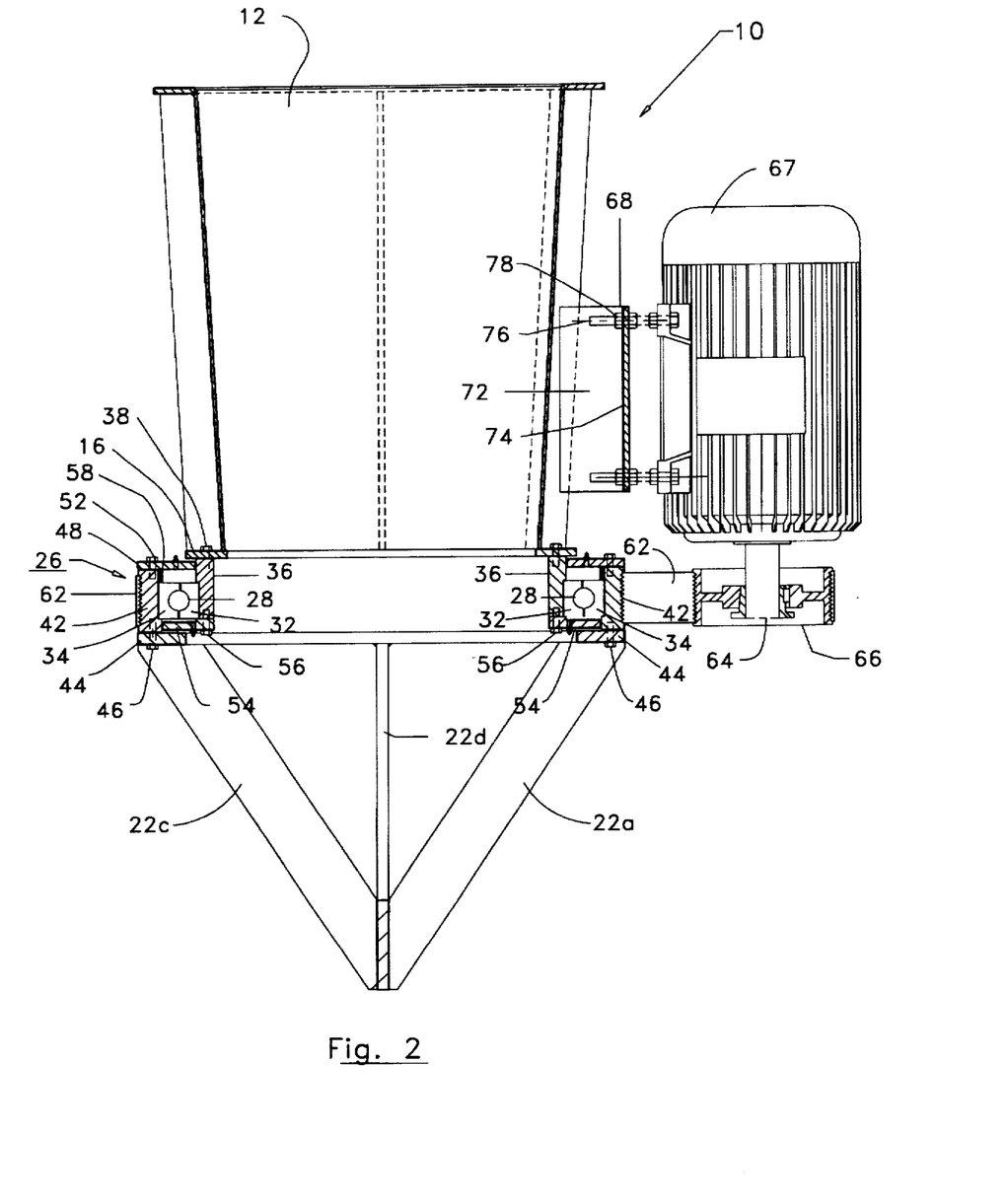
FIG. 2 is a side cross-sectional view of the dispersing apparatus of FIG. 1.

The circular bearing housing 26 enables rotation of the cone-like impeller 18 about an axis substantially in line with the central axis corresponding with the tube spout 12. A cross-sectional view of the circular bearing housing 26 is illustrated in FIG. 2. As shown in FIG. 2, the bearing housing 26 encloses a ring of bearings 28 for permitting relative movement between a fixed ring-like bearing support surface 32, which is affixed to the tube spout 12; and an outer, rotatable, ring-like bearing supporting surface 34 connected to the cone-like impeller 18 and rotatable therewith. The ring-like bearing supporting surface 32 is affixed to the tube spout 12 via a ring-like bearing housing side 36 connected to the lower tube spout flange 16 by way of bolts 38. The outer ring-like bearing supporting surface 34 is connected to the impeller 18 via a circular drum sleeve 42 mounted to an impeller flange 44 by means of bolts 46. Each of the impeller blades 22a–22d is affixed via any conventional means to the circular impeller flange 44. Furthermore, a bearing housing top cover 48 mounted to the drum sleeve 42 with bolts 52 constitutes the top portion of the bearing housing 26. Moreover, a bearing housing bottom cover 54 mounted to the bearing housing side 36 via bolts 56 constitutes the bottom portion of the bearing housing 26. Finally, a spacer ring 58 is disposed within the bearing housing 26 in order to maintain the ring of bearings 28 as well as bearing supporting surfaces 32, 34 downwardly in engagement with their respective bottom supporting surfaces.

The cone-like impeller 18 is driven by a belt 62 surrounding the drum sleeve 42 in frictional engagement therewith. The belt 62 is driven by a motor driving shaft 64 having a belt pulley 66 for frictionally engaging the inner surface of the belt 62. The driving shaft 64 is rotated by a motor 67 which is mounted to the tube spout 12. In the preferred embodiment, the motor 67 is an electric motor rated at 75 horsepower and is capable of rotating the cone-like impeller 18 at 550 rpm (rounds per minute).

The motor 67 is mounted to the side of the tube spout 12 with any conventional bracket mechanism. In the preferred embodiment, a bracket mechanism 68 has a U-shaped plate 72 with a face 74 for supporting bolts 76 configured to connect the plate 72 to the motor 67. Nuts 78 affix the foregoing arrangement. Hence, the motor 67 remains stationary with respect to the tube spout 12 during operation of the present invention.

For purposes of describing the operation of the present invention, FIG. 3 shows an example of a possible implementation of the dispersing apparatus 10. As illustrated in FIG. 3, a boom 82 carries the feeding channel 13 over the storage area 84 of a transportation vessel 86. Moreover, the dispersing apparatus 10 is mounted near the supply outlet 17 of the feeding channel 13.

Material pieces 11 are channeled along the boom 82, as indicated by arrows 88, via any conventional mechanism, to an upper orifice 83 of the feeding channel 13. As an example, the material pieces 11 may be transported along the boom 82 via a conventional conveyor system. When the material pieces 11 reach the upper orifice of the feeding channel 13; the material pieces 11 fall under the force of gravity, as indicated by an arrow 92, in a direction toward the dispersing apparatus 10. As the stream of material pieces 11 is directed through the dispersing apparatus 10, the material pieces 11 are transversely engaged with the rotating impeller blades 22a-22d. As a result, the material pieces 11 are propelled outwardly and downwardly, and uniformly toward the storage area 84.

Those material pieces 11 which are engaged by the outer edge of the impeller blades 22a-22d are propelled by impact with the rotating mass on a path perpendicular to the rotating face and follow a curved trajectory out and downward with the influence of gravity. For impact on a particular horizontal plane of the storage area 84, the distance of propulsion varies with the angular velocity of the contacted blade 22a-22d. Further, those material pieces 11 whose path of propulsion is obstructed by adjacent falling material pieces 11 are engaged by the rotating impeller 18 until their tangential velocity causes centrifugal propulsion on a path and trajectory similar to those propelled by direct impact.

The material pieces 11 actually travel through the air in a variety of orientations and with the sides parallel to the plane of the trajectory and the narrow edges leading the travel because of air resistance. In essence, the material pieces 11 orient themselves to provide the least resistance to air. Further, the freely falling material pieces 11 have a downward velocity equal to the product of the acceleration of gravity and the corresponding time period for the fall. This time of fall can be calculated from well known mathematical equations of physics for an established height of fall.

Significantly, the material pieces 11 are uniformly dispersed by the dispersing apparatus 10 so that they are sufficiently spaced at the point of impact. This spacing allows the individual material pieces 11 enough space to fall over on their flat sides, if any, and stow generally horizontally. This is the predicament for wood chips which are generally flat rectangular or rhomboid shape. Moreover, the horizontal component of the velocity at impact causes the material pieces 11 to continue to slide on their flat sides until contact is made with adjacent deposited material pieces 11, thereby further closing the air spaces between them. This orientation allows compact stowing in the storage area 84 with substantially less space and less trapped air in the interstices.

Another significant feature of the present invention is a mechanism for constricting the stream of material pieces before the impeller blades 22a-22d engage the falling material pieces 11. Constriction is effectuated by angling the cylindrical tube spout 12 inwardly from its periphery. In other words, the spout diameter at the upper flange 14 is larger than the spout diameter at the lower flange 16. This feature provides for a more efficient process and more efficient distribution of the material pieces 11 by eliminating much of the air within the stream of material pieces 11.

Another capability of the dispersing apparatus 10 in accordance with the present invention is the selective directing and depositing of material pieces 11 to specific regions within the storage area 84. The foregoing capability is illustrated in FIG. 4. In other words, the center of the distribution pattern of the emanating material pieces 11 can be shifted, while maintaining sufficient and uniform distribution of the material pieces 11.

In order to shift the distribution pattern, the feeding channel 13 is angularly adjusted, or tilted, from its freestanding vertical axis y, denoted by reference numeral 94, so that the material pieces 11 gravitate to the elevational lower side of the tube spout 12 and are fed into the rotating impeller 18 predominantly on that side. Consequently, the material pieces 11 are propelled more predominantly in the direction opposite to the direction of tilt, as shown by phantom lines in FIG. 4. This capability is particularly useful in filling irregularities of the storage area 84 and in filling out the corners of rectangular areas, for example.

Furthermore, tilting the feeding channel 13 about the vertical axis y provides the capability of centrally focusing the material pieces 11 travelling toward the impeller 18 so as to achieve a more uniform distribution pattern, as illustrated in previously described FIG. 3. The foregoing feature is particularly advantageous when material pieces 11 exhibit spiralling motion down through the feeding channel 13 to the supply outlet 17.

Figure 5:
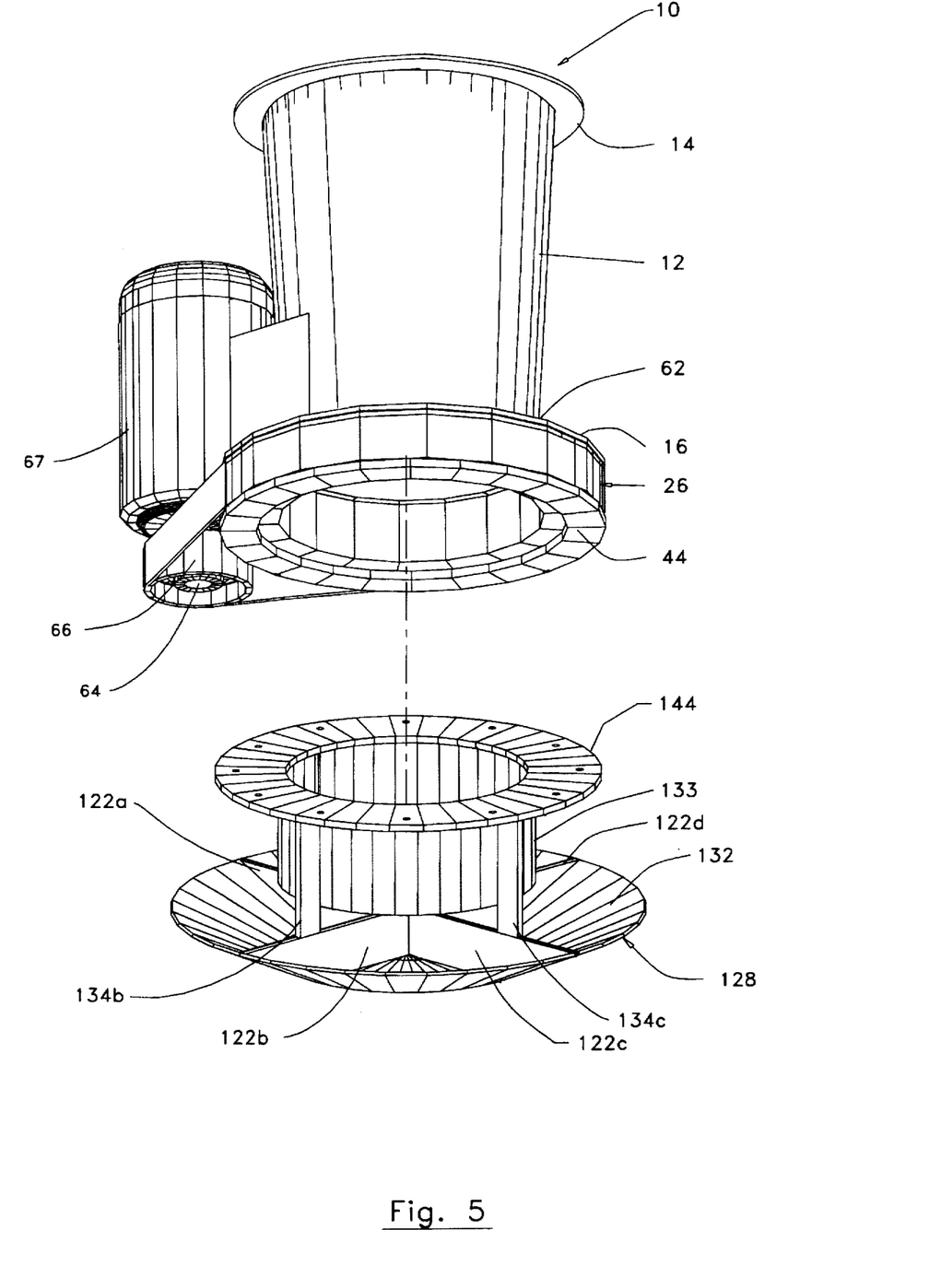
FIG. 5 is a perspective view of a partially disassembled second embodiment of the dispersing apparatus in accordance with the present invention having a dish-like impeller.

A second embodiment of the dispersing apparatus of the present invention is illustrated in FIG. 5 and is generally designated by reference numeral 110. The dispersing apparatus 110 comprises a dish-like impeller 118 for replacing the impeller 18 of the dispersing apparatus 10 in order to propel material pieces 11 radially outwardly and upwardly. The preceding trajectory is useful in stowing the material pieces 11 in those difficult regions of the storage area 84 which are not readily accessible via the outward and downward trajectory provided by the cone-like impeller 18. For example, the dish-like impeller 118 is useful in filling storage regions under the decks surrounding the entryway to the storage area 84. Another example is around the hold web frames and tween-deck webs of a ship hold.

With reference to FIG. 5, the dish-like impeller 118 has a plurality of impeller blades 122a-122d configured to transversely engage material pieces 11 passing through the tube spout 12 of the dispersing apparatus 10. A dish 128 having a concave deflection surface 132 is positioned under the impeller blades 122a-122d in order to deflect the material pieces 11 outwardly and upwardly during engagement of the impeller blades 122a-122d with the downwardly falling material pieces 11.

The material pieces 11 are channeled to the impeller blades 122a-122d and the associated dish 128 via a cylindrical channel 133 connected to the impeller blades 122a-122d by means of corresponding vertical support bar members 134a-134d. A flange 144 is disposed at the uppermost end of the circular channel 133 so as to permit affixing of the dish-like impeller 118 to the bearing housing 26. Preferably, bolts 46 of FIG. 2 or the like are utilized to attach the impeller 118 to the bearing housing 26.

In operation, the motor 67 preferably rotates the dish-like impeller 118 at 225 rpm. As a consequence, the dish-like impeller 118 provides a distribution pattern resulting in a donut-like accumulation configuration of the material pieces 11 in the storage area 84.

Figure 6:
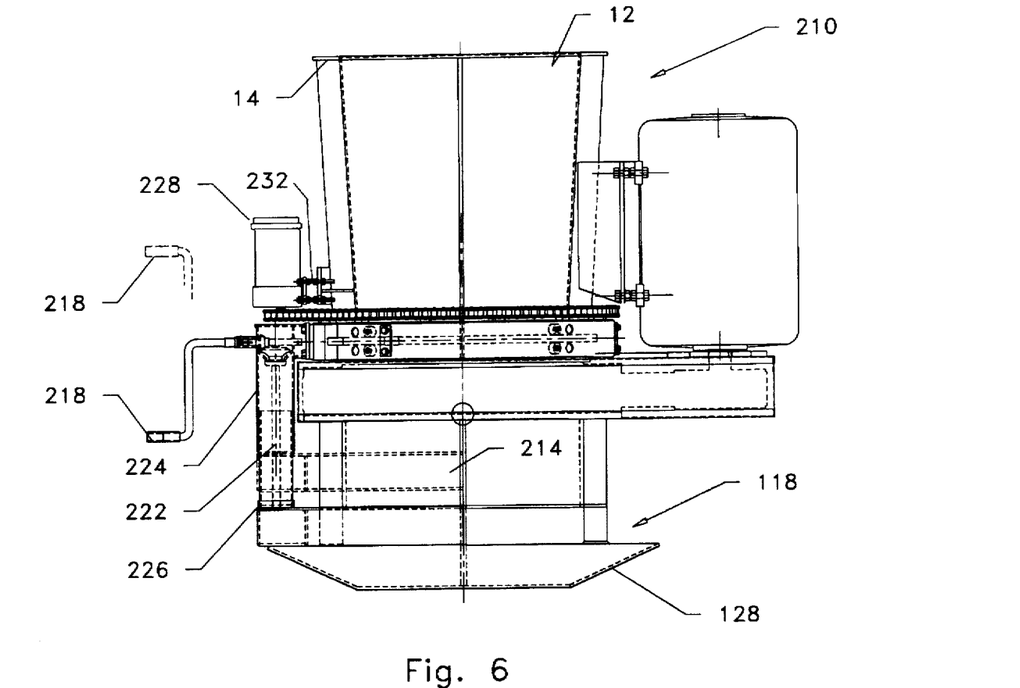
FIG. 6 is a side view of a third embodiment of the dispersing apparatus in accordance with the present invention which incorporates a directional deflection mechanism and the dish-like impeller of FIG. 5.
Figure 7:
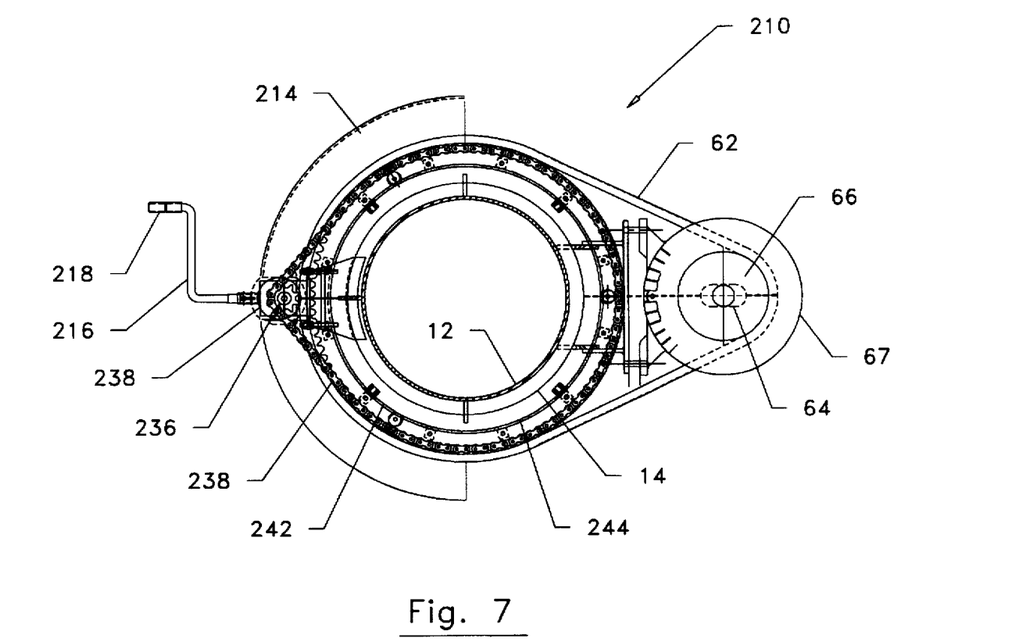
FIG. 7 is a top plan view of the dispersing apparatus of FIG. 6.
Figure 8:
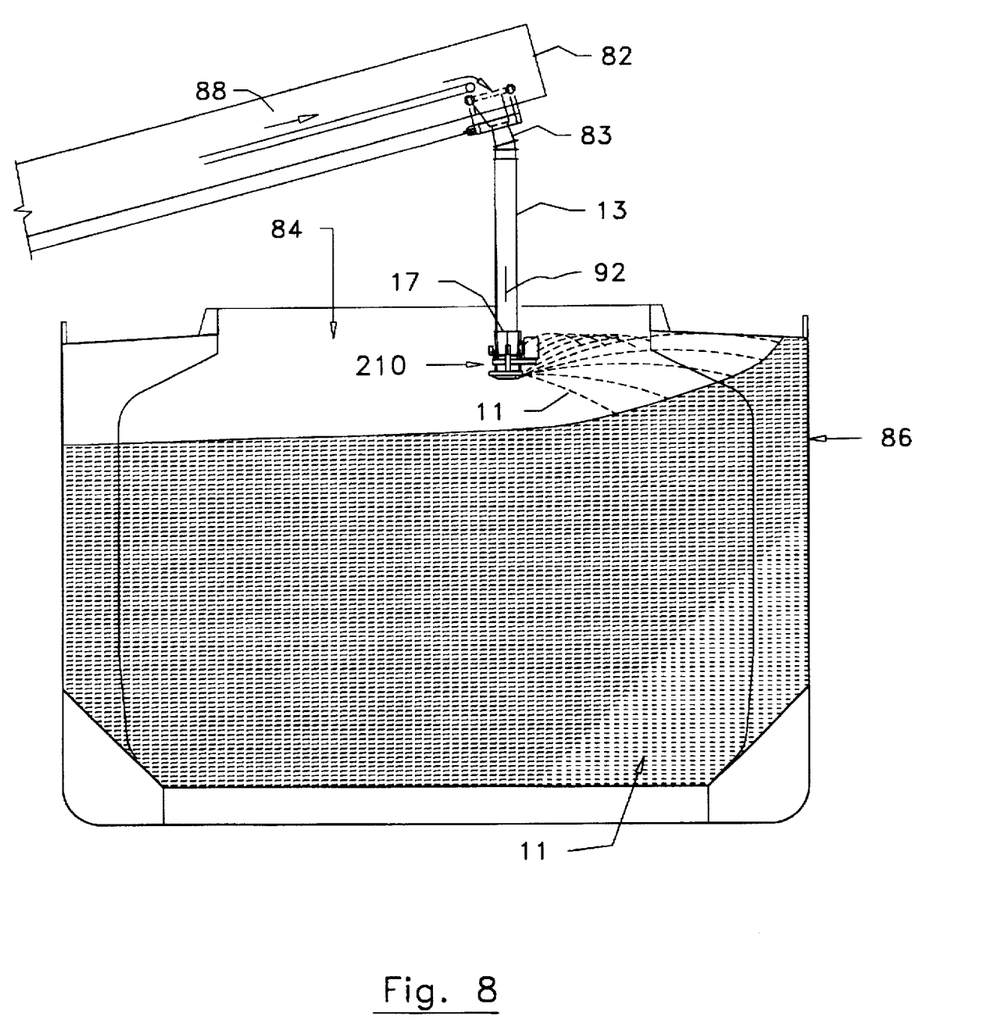
FIGS. 8 and 9 are schematic views showing the distribution of material pieces resulting from operation of the dispersing apparatus of FIGS. 6 and 7.

FIGS. 6 and 7 illustrate implementation of a novel directional mechanism 212 on a dispersing apparatus 210 having the impeller 118. The dispersing apparatus 210 is useful in directing material pieces 11 upwardly and in a specific directions as illustrated in FIG. 8. Such directional control is very useful to uniformly fill around hold web frames and tween-deck webs of a ship, for example, in order to create this directional control, the directional mechanism 212 has a deflector shield 214 for partially blocking the distribution of material pieces which are sprayed from the dispersing apparatus 210. Preferably, the deflector shield 214 spans 180° of the periphery of the impeller 118. A top view of the distribution pattern resulting from the 180° deflector shield 214 is illustrated in FIG. 9. It should be noted that the deflector shield 214 may be configured to cover more or less of the periphery as required by the particular application.

With reference back to FIGS. 6 and 7, the deflector shield 214 can be raised or lowered with a crank 216 having a handle 218. The crank 216 rotates a threaded rod 222 passing in threaded engagement through the deflector shield 214 so that as the threaded rod 222 rotates, the deflector shield 214 moves up or down along the same. The threaded rod 222 is housed by rod housing 224 and end piece 226.

The deflector shield 214 may be rotated about the dispersing apparatus 210 via any conventional mechanism. In the preferred embodiment, the deflector shield 214 is rotated by a gear motor 228 mounted to the side of the tube spout 12 via any conventional mounting mechanism 232. The gear motor 228 rotates a sprocket 234 affixed to its drive shaft 236 to thereby drive a chain 238 which engages a sprocket 242 mounted on a circular rolled channel frame 243. The deflector shield 214 is suspended from the channel frame 243 with rollers on top which ride on, and are guided by, a circular guide rail 244. The circular guide rail 244 is mounted on and supported by the tube spout 12.

It will be obvious to those skilled in the art that many variations and modifications may be made to the specific embodiments described previously without substantially departing from the spirit and scope of the present invention. Accordingly, all such variations and modifications are intended to be included herein and within the scope of the following claims.

Wherefore, the inventor claims the following inventions:

1. A dispersing apparatus for uniformly dispersing a stream of particulate material pieces into a storage area from a supply outlet in order to achieve efficient and compact accumulation of the material pieces in the area, the dispersing apparatus is configured to be disposed substantially adjacent said supply outlet and comprising a single converging spout and an impeller operatively connected to the spout, via a bearing housing, including a plurality of impeller blades disposed remote from said spout for rotating through said stream for transversely engaging and thereby propelling said material pieces outwardly from said supply outlet and toward said area, wherein the impeller is driven by a motor disposed adjacent said spout and a belt connecting said motor to said bearing housing and wherein the spout is arranged such that it provides a passage for said particulate material pieces with no obstruction by objects so as to allow said material to be delivered unfettered to the impellers and storage area.

2. The apparatus of claim 1, wherein said impeller blades are arranged to form a cone configuration.

3. The apparatus of claim 1, further comprising a means for constricting said stream before said impeller blades engage said material pieces.

4. The apparatus of claim 1, wherein said supply outlet is connected to an elongated tube configured to channel said material pieces under the force of gravity.

5. The apparatus of claim 1, further comprising means for detachably engaging said dispersing apparatus with said supply outlet.

6. The apparatus of claim 1, further comprising a deflection surface situated beneath said impeller blades and substantially orthogonal to said stream of material pieces, said deflection surface for deflecting material pieces upwardly from said supply outlet.

7. The apparatus of claim 6, further comprising a deflector shield peripherally situated about said impeller blades, said deflector shield for directing said material pieces in a particular direction.

8. The apparatus of claim 7, further comprising motor means for rotating said cone configuration.

9. The apparatus of claim 8, further comprising a belt for engaging a driving shaft of said motor means with the periphery of said ring of bearings.

* * * * *